United States Patent
Frolund et al.

(10) Patent No.: US 6,442,552 B1
(45) Date of Patent: Aug. 27, 2002

(54) METHOD AND APPARATUS FOR IMPLEMENTING THREE TIER CLIENT ASYNCHRONOUS TRANSPARENCY

(75) Inventors: Svend Frolund, Mountain View, CA (US); Rachid Guerraoui, Montherod (CH)

(73) Assignee: Hewlett-Packard Company, Palo Alto, CA (US)

( * ) Notice: Subject to any disclaimer, the term of this patent is extended or adjusted under 35 U.S.C. 154(b) by 259 days.

(21) Appl. No.: 09/608,124

(22) Filed: Jun. 30, 2000

(51) Int. Cl.[7] ............................................. G06F 17/30
(52) U.S. Cl. ............................ 707/10; 707/4; 709/229
(58) Field of Search ........................ 707/10, 200, 201, 707/202, 203, 204, 205, 103, 4; 709/229

(56) References Cited

U.S. PATENT DOCUMENTS 6,085,198 A  * 7/2000 Skinner et al. ............. 707/103
6,134,594 A  * 10/2000 Helland et al. ............. 709/229
6,226,637 B1 * 5/2001 Carey et al. ................... 707/4
6,266,666 B1 * 7/2001 Ireland et al. ................ 707/10
6,285,997 B1 * 9/2001 Carey et al. ................... 707/4

\* cited by examiner

Primary Examiner—Diane D. Mizrahi (57) ABSTRACT

A client method for providing three tier asynchronous client transparency includes sending a request and a count from a client to a first application server of an application server group. The request and count are resent to the group, if no corresponding decision is received within a pre-determined time period. The request is resent with an incremented count to a selected one of the first application server and the group, if the corresponding decision indicates that the result has not been committed. An application server method attempts to write a server identity to a write-once register in response to receipt of a client tier originated request. An attempt is made to write the computed result and a determined outcome as a first decision to the write-once register. The transaction identified by the request is terminated consistent with a second decision indicated by the write-once register. The result of the second decision is provided to the client-tier.

20 Claims, 7 Drawing Sheets

| INDEX 320 | SERVER ID 330 | RESULT 340 | OUTCOME 350 |
|---|---|---|---|
| 1 | A1 | NIL | ABORT |
| 2 | A1 | NIL | ABORT |
| 3 | A2 | NON-NIL | ABORT |
| 4 | A2 | NON-NIL | COMMIT |

AHZZ894
REQUEST ID
310

METHOD AND APPARATUS FOR IMPLEMENTING THREE TIER CLIENT ASYNCHRONOUS TRANSPARENCY

FIELD OF THE INVENTION

This invention relates to the field of multiphase transactions. In particular, this invention is drawn to distributed transactional processing.

BACKGROUND OF THE INVENTION

Internet commerce applications are typically distributed applications with at least a three tier architecture. One tier handles presentation (e.g., the user interface), another tier handles the logic of the application, and yet another tier handles the data. Clients (e.g., browser software) handle the presentation. Application servers such as web servers handle the core logic of the application, but are otherwise stateless. A database contains the data and the state of the application. Application servers processes a client submitted request and store a resulting state in the database. The application server then returns a result to the client. This architecture has become prevalent with the advent of commerce on the Internet.

One advantage of partitioning the commerce applications into several tiers is that modularity provides for ease of management and scalability of the applications. Reliability in processing transactions is also needed to ensure that transactions are processed efficiently and with certainty. One disadvantage of the multi-tier architecture is that reliability is limited to "at most once" request processing. Essentially, the request will be serviced at most once, if the request is processed at all.

A limitation of such a reliability standard is that the client-side software may not be able to distinguish between "all" or "nothing". If a failure occurs at the application server or database tier or a timeout occurs on the client side during processing, the end user receives an exception notification.

The exception notification does not indicate whether the requested transaction was performed or not. The user retries the request at the risk of inadvertently executing the transaction more than once. Thus reliability for each transaction is limited to an "at most once" transaction processing and the client can issue multiple requests to obtain an "at least once" assurance. Unfortunately, rather than an "exactly once" result, the combination of submitting the same request multiple times with an "at most once" reliability standard places the end user at risk of having the desired request being processed more than once.

Client transparency masks middle tier and database failures from the front-end client. One goal of client transparency is to ensure "exactly once" processing by automatically retrying transactions at the appropriate server level when the transactions abort due to failures at the server or database tiers.

One technique for client transparency relies on the assurance that a single server handles a selected request. This may not be a practical approach in an environment where multiple application servers may be concurrently working on the same request. Additional transaction tracking overhead is required in fault tolerant system to ensure that the primary server(s) handling a transaction have indeed failed, thus delaying the backup server take-over process. The failure detection process must be perfect in order to ensure that only one of the primary or the backup server is handling the request. Delaying the backup server take-over may result in a substantially increase in the number of potentially at-risk transactions due to the asynchronous nature of the requests.

One three tier architecture uses a transaction processing monitor to enable clients to abort a transaction if a reply value is not received from the second or third tiers after a pre-determined time interval. The client, however, does not participate in the commitment of transactions. If the second or third tier transaction manager fails, the outcome of the transaction may be unknown to the client.

Another solution is to include the client as a participant in order to ensure the outcome is communicated to the client. One disadvantage of this approach is that "thin clients" such as browsers may not have the resources needed to support participation. Furthermore, additional communication is required between the client and the second tier because the client will be involved in the two-phase commit process. Finally, as a participant, the client becomes a potential point of failure for the two-phase commit process required across the transaction participants.

SUMMARY OF THE INVENTION

Methods and apparatus for performing three tier asynchronous client transparency are described. A method for processing at the client tier includes the step of sending a request and a count from a client to a first application server of an application server group. The request and count are resent to the application server group, if no corresponding decision comprising a result and an outcome is received within pre-determined time period. The request is resent with an incremented count to a selected one of the first application server and the application server group, if a corresponding decision comprising a result and an outcome indicates that the result has not been committed. The result of the decision is provided to an end-user, if the outcome indicates that the result has been committed.

A method for processing at the application tier includes the step of receiving a request originating from a client tier. An attempt to write a first application server identifier to a write-once register entry associated with the request is made in response to receipt of the request by the first application server. A result is computed for the request. An outcome is determined for the result. An attempt to write the result and outcome as a first decision to the write-once register entry is performed. An attempt to terminate a transaction identified by the write-once register entry in accordance with a second decision indicated by the write-once register entry is then performed.

A method of handling transactions for application servers suspected of failure includes the step of selecting an active transaction of a suspected application server of an application server tier. An attempt is made to invalidate the transaction by writing a decision with an aborted first outcome to a write-once register entry associated with the selected active transaction. Commands are issued to a database tier to terminate the transaction in accordance with a second outcome indicated by the write-once register entry.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
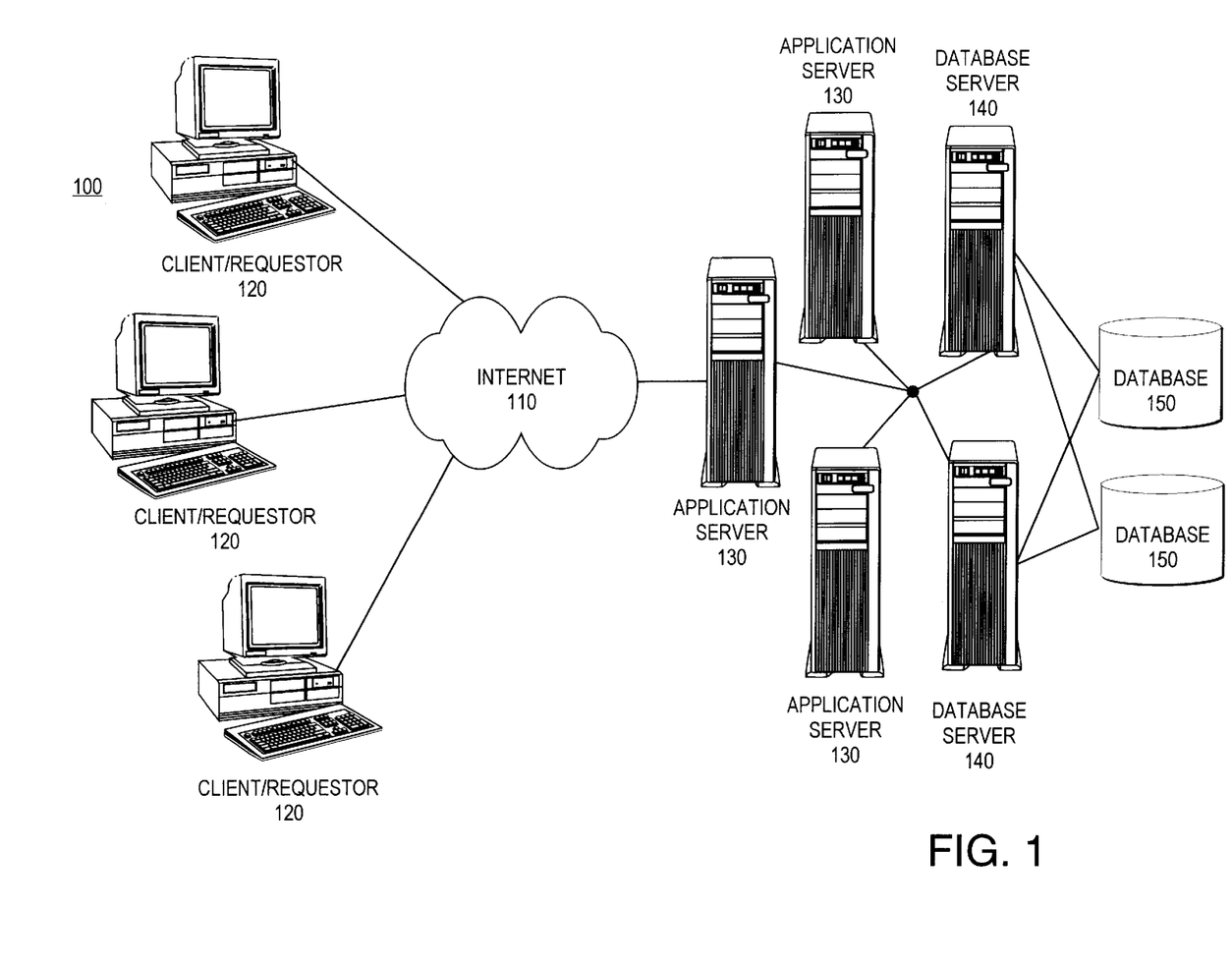
FIG. 1 illustrates a three tier transaction processing system.

FIG. 1 illustrates a three tier transaction processing architecture 100. The three tier architecture is a distributed architecture and has become a prevalent architecture in Internet commerce. Client/requestors 120 represent the first or top tier of the architecture. The first tier provides end-users with a front-end interface to the application servers 130. The front-end interface includes the user interface and related services such as session, text input, dialog, and display management. For Internet applications, the front-end is a software application referred to as a "browser" that is executing on the client machine 120. The browser application provides a graphical user interface that enables the user to navigate to and request different resources accessible through the Internet.

The second or middle tier represented by application servers 130 provides process management where the business logic is executed. Validation of a request, for example, is one example of processing handled by the application server. The middle tier also provides functions such as queuing, application execution, and database staging. A communications medium such as the Internet 110 enables client/requestors 120 to issue requests to one or more application servers 130. The application server 130 is typically handling requests from multiple users in an asynchronous manner. The application servers are stateless. Although the application servers are stateless, they have side-effects on the databases 150.

The third or bottom tier includes databases 150 and database servers 140 which are collectively referred to as the database unless explicitly indicated otherwise. The third tier provides database management services including data locking, consistency, and replication services to ensure that data is consistent throughout the distributed environment. The application servers 130 execute database queries and updates to databases 150 through database servers 140. After processing a client submitted request, the application server returns the result to the appropriate client/requestor.

In order to achieve exactly once transaction processing across three tiers, an at least once protocol is combined with an at most once protocol in a three tier distributed architecture. Consider the example of an end user desiring to book airline reservations and hotel reservations secured by a credit card. The user desires that the reservations be booked exactly once. Assuming that the resources (i.e., hotel room and flight seating) are available, duplicate bookings or no bookings are both undesirable outcomes.

In a system where the first tier will be retrying the transaction, the first tier must be provided with some indication once the transaction is committed. Regeneration of the indicator is not possible without repeating the transaction. Also, if the first tier is able to detect a second or third tier failure, the first tier must still be able to determine whether the transaction was committed. When multiple databases are involved, the second tier must orchestrate a two-phase commit protocol to ensure that the two-phase commitment process is terminated (whether the transaction failed or succeeded) so that resources are not held on behalf of failed transactions.

One difficulty is that the transaction takes place between the second and third tiers such that the first tier is not directly involved in the transaction. Transaction atomicity cannot be used to guarantee that the client receives a reply value before the transaction is committed. Moreover, in order to support web-based systems where clients use a non-transactional messaging system such as hypertext transport protocol (http) to communicate with the middle tier, the clients cannot directly participate in the transaction between the second and third tiers. Instead of including the client as a transaction participant, the client is treated as a special participant communicating with the transaction-enabled second and third tiers using a specific messaging rather than transaction based protocol.

Client processes issue requests to application servers. Clients are denoted by $c_1, c_2, \ldots c_n$ ($c_i \in$ Clients). Requests are issued by clients to one or more application servers. The same request may be sent multiple times from a particular client.

Each request originated by the end-user has a unique identifier (request ID) to enable easily distinguishing the request from unrelated requests originated by the end-user. The request ID may also be referred to as a transaction identifier. The request ID enables associating automatically generated retry requests with the original request submitted by the user.

Requests are accompanied by an index variable (count) to identify the particular iteration of the request. The combination of request ID and count enables tracking the progress of a selected attempted transaction. In response to the issuance of the request, the client expects to receive a decision from the application server tier. The decision consists of a result and an outcome indicative of the whether the result has been committed to the databases. Committed results may be delivered to the end-user. Clients are able to communicate with databases only through application servers.

Each result is uniquely associated with a transaction. When the result is returned, the associated transaction has been committed from a database perspective. Once a transaction request is issued from a client, the request is processed without further input from the client. Clients issue requests one at a time and individual requests from the same client are treated as unrelated.

Application servers are denoted as $a_1, a_2, \ldots a_n$ ($a_i \in$ Application Servers). The application servers are stateless. Thus they do not maintain states across request invocations. Requests have side-effects on the databases but not the application servers. Advantages of stateless application servers includes fast fail-over because there is no need to restore or recover a state. Stateless servers also enable free migration. In one embodiment, a client invokes a single application server and this application server does not invoke other application servers. Thus in one embodiment, there is no chained invocation of application servers.

The primitive compute( ) is used to abstract the business logic performed by the application servers without regard to the details of the business logic. In a travel application, for example, compute(request) would query the databases for the appropriate hotel and flight reservations and perform the appropriate bookings without committing the bookings to the databases. Compute( ) returns a pre-commit result such as the flight itinerary, price, confirmation number, and hotel price and confirmation number. Computeo may be called several times with the same request. Compute( ), however, is non-deterministic because its result depends on the database state.

To simplify the model, the result returned by compute( ) is presumed to be non-nil. Thus user-level errors are treated as regular result values. An example of a user-level error is when reservations cannot be made because the flight or hotel are already booked to capacity.

Each application server has access to a local failure detection module that enables it determine the failure status of other application servers. Thus $a_2$ suspects $a_1$ if the failure module of $a_2$ suspects that $a_1$ has failed or crashed. Detection is abstracted through the primitive suspect( ). The execution of suspect($a_1$) at time t by $a_2$ is true, if and only if $a_2$ suspects $a_1$ at time t.

Database server processes are denoted by $d_1, d_2, \ldots d_n$ ($d_i \in$ Database Server List). In one embodiment, the database server processes do not invoke other database server processes. The primitives vote( ) and decide( ), are used by the database servers to co-ordinate the two-phase commit process with the application servers. The vote( ) primitive is used to prepare the databases for committing the result. The decide( ) primitive is used to commit or abort the transaction.

Each result is associated with a unique result identifier. The vote( ) primitive takes the result identifier and returns a vote in the domain {yes, no} indicative of whether the transaction can be committed. The decide( ) primitive is used by the application servers to instruct the database servers to actually commit the transaction.

A two-phase commit is a process that enables databases to be returned to a pre-transaction state if an error condition occurs. One transaction may update multiple databases. The two-phase commit process is designed to ensure that the databases are transactionally synchronized such that either all the databases are updated or none of them are updated.

The two-phase commit is typically accomplished by storing the changes to be made by each database to that database. The synchronization process issues a "pre-commit" command to each database that requires an acknowledgement. The synchronization process issues a "commit" command to each of the databases only after receiving the acknowledgement from each database to be updated. The commit command causes the databases to substantially simultaneously make the database changes permanent rather than temporary.

In order to ensure exactly once processing, the distributed process includes features to ensure termination, agreement, and validity of the transaction. Whenever a client issues a request, the client will eventually receive a result unless the client tier "crashes." From the client's perspective, delivery of a result is a termination of the transaction. From the database tier perspective, termination implies that the transaction is terminated in one of two states: committed or aborted. To simplify the discussion, a user-level error (e.g., such as no seats available for a particular flight in a flight reservation system) is returned to the client indicating that the result has been committed even though no modification may have actually been committed to the database. From a database perspective the result is still "committed."

Termination helps to ensure that the client is not blocked such that the client can retry at-least-once request processing. If any database server $d_i$ votes for a result then that server $d_i$ eventually commits or aborts the result. Transaction termination helps to prevent resource blocking situations at the application and database tiers. The non-blocking property is necessary to ensure that a database will eventually reallocate resources that have been locked pending an aborted or committed outcome by the database servers.

Agreement ensures consistency of the result provided to the client and the result committed to the databases. No result is delivered by the client unless the result is committed by all database servers. For a given request, no database server commits two different results. Furthermore, in an environment where more than one database server is present, no two database servers decide differently on the same result. Agreement is also used to guarantee at-most once request processing.

Validity ensures that invalid results are excluded from the domain of possible results. The client only delivers results to the end-user that are directly associated with a request issued by that client. Moreover, no database server commits a result unless all database servers have agreed to that result.

The constraints on termination, agreement, and validity enable using processes better suited for at least once processing to achieve at most once results in the three tier distributed architecture.

Figure 2:
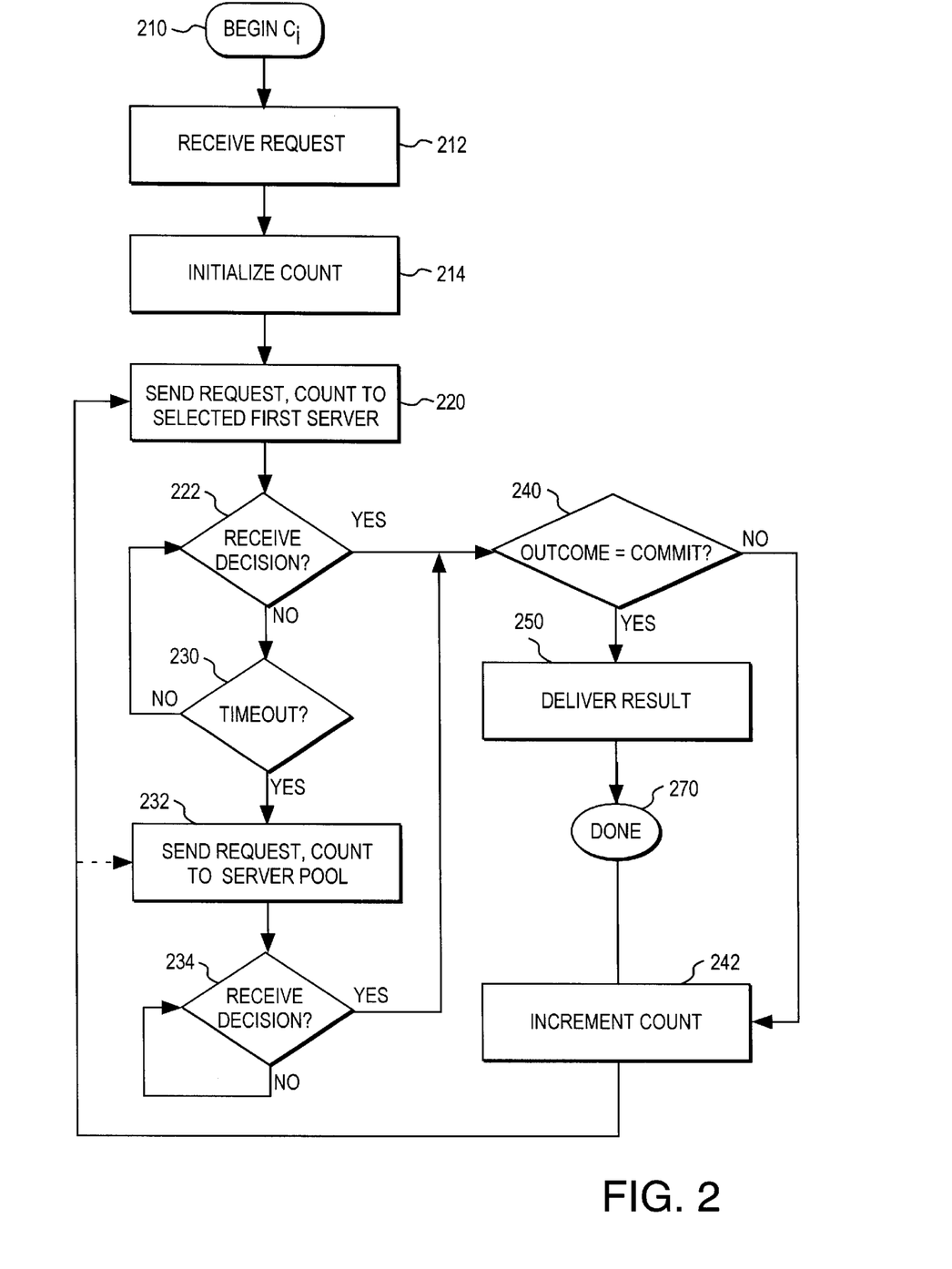
FIG. 2 illustrates a client tier portion of a three tier asynchronous transaction replication process.

FIG. 2 illustrates a portion of the three tier asynchronous transaction process performed at the client tier for a given client, $c_i$, beginning with step 210. Generally, the client tier asynchronously retries the request without further interaction from the end-user until either the client "crashes" or a decision with an outcome indicative of a committed result has been received.

The client receives a request in step 212. This request is typically generated, for example, by the end-user. A count variable is initialized in step 214. In one embodiment, the count variable is used as an index into a write-once register and is generally indicative of the number of aborted attempts to process the transaction at the application server tier. The client sends the request and the associated count to an application server group having at least one application server in step 220.

Although the client may broadcast the request to the application server pool or group, the client identifies a selected first server for initially handling the request in one embodiment. This approach tends to improve performance when there are no system failures.

Step 222 determines whether any decision (i.e., result, outcome pair) has been received by the client tier. If no decision has been received, step 230 determines if a timeout event has occurred. In one embodiment, a timeout event occurs if no decision has been received within a predetermined time period measured from the issuance of the request in step 220. If a timeout event has not occurred, processing returns to step 222. Steps 222–230 are repeated until either a decision is received or the timeout period has elapsed.

If the timeout period has elapsed as determined by step 230, the request is retried by sending the request and the count to the application server pool or group without modifying the count in step 232. Thus multiple requests with the same count may be sent to the application server pool. No further processing occurs until a decision is received as indicated in step 234. No timeout is necessary here because at least one of the application servers is presumed to be able to respond such that the client tier will eventually receive a decision even if the outcome is not committed.

Once a decision is received as determined by either step 222 or step 234, step 240 determines if the outcome of the decision indicates that the result has been committed. If the result has not been committed, then the count is incremented in step 242. In one embodiment, the request and incremented count are sent to the selected first application server in step 220. In an alternative embodiment, the request and incremented count are sent to the application server group in step 232. The process continues until a committed result has been obtained.

Referring to step 240, once the decision outcome indicates that the result has been committed, then the result can be delivered to the end-user in step 250. The client tier portion of the transaction processing system is then completed in step 270.

At the application server tier, the exactly once execution process uses an entity referred to as a write once register. The write once register is not necessarily a true register. The write once register is a semantically abstracted object that may be physically implemented in any number of ways. The write once register has the following properties. The write once register may be organized as a number of individually writable and readable portions. Once initialized, any portion can be transitioned to another state or value only once. Thus once data is written to a selected portion of the register, the written data cannot be overwritten with subsequent data during the life of the register or until the register is re-initialized. A register may ultimately be reclaimed through a retirement process. In one embodiment, whenever a new write-once register is allocated, the various portions will be initialized to pre-determined values.

Figure 3:
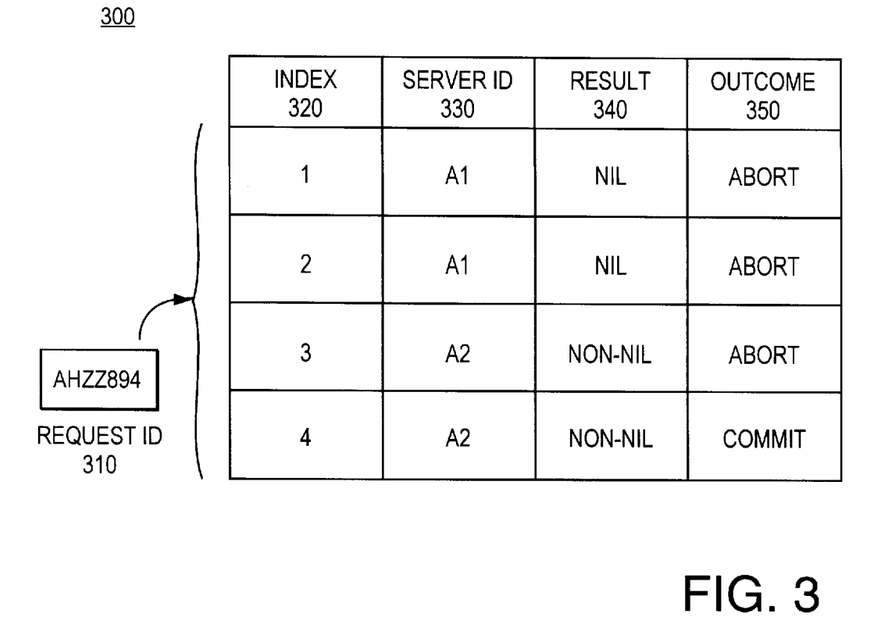
FIG. 3 illustrates one embodiment of a write-once register.

FIG. 3 illustrates one embodiment of the organization of a write-once register 300. In one embodiment, register 300 includes an index field 320, a server ID field 330, a result field 340, and an outcome field 350.

Each write-once register is associated with a request ID 310 extracted from the request issued by the client. The request ID enables identification of multiple attempts to process the same transaction through separately issued requests. The request ID allows association of the multiple attempts with a particular write-once register. The write-once register for a given request ID is modeled as a table or array in FIG. 3. There should only be a single instance of the write-once register for a given request ID at any point in time within the shared memory. Thus a given request ID effectively identifies a region in memory uniquely associated with the requests for the same transaction at a given point in time. The method of mapping request IDs uniquely to write-once register may vary depending upon the physical implementation of the shared memory architecture.

The index field 320 identifies the individual attempts to process a transaction in response to aborted database commit operations. The count parameter from the client tier is used to index a particular request instantiation. Thus, the count variable can be used to reference a specific iteration (using the index field 320) of a request identified by the request ID 310. Semantically, for a given request ID each row corresponds to a retried request sent by the client. Such a write-once register may be treated as a request array wherein individual entries or rows correspond to separately sent requests that may be indexed by the count variable. Thus, in one embodiment, the index field 320 is redundant and may be eliminated.

The server ID field 330 identifies the application server that has ownership of a specific iteration of an attempted request. The result field 340 stores the result to be provided to the client assuming that the transaction is ultimately committed. The outcome field 350 indicates whether the transaction has been committed or aborted by the databases. Collectively, the result 340 and outcome 350 fields represent the decision returned by the application tier to the client tier in response to a given request.

All application servers capable of handling a client request need access to the write once register 300. In one embodiment, the write once register is implemented in shared memory in order to support such access. Although the shared memory may be implemented as a common memory physically shared by multiple application servers (e.g., symmetric multiprocessor (SMP) systems), such an implementation does not tend to scale well and encounters significant resource contention after a relatively small number of application servers are sharing the memory. Another disadvantage of an SMP design is that the fault domain is spread across the entire system. If a memory failure occurs, all application servers sharing the same physical memory will be impaired.

An alternative implementation is to provide the shared memory abstraction across the physically distributed memory of individual application servers. This shared memory abstraction is referred to as distributed shared memory (DSM). DSM can be implemented in software to provide the shared memory programming model on networks of loosely coupled computers. Messaging is one technique used for software implemented DSM. DSM can also be implemented in hardware using cache consistency protocols to support shared memory across physically distributed main memories. In one embodiment, for example the write once register is replicated and updated across all the application servers.

The decentralized implementation of a semantically abstracted object (write-once register) enables a simplified conceptual viewpoint of "shared" while increasing performance (no contention for common resources) and maintaining a smaller fault domain than what is otherwise possible using a true physically shared memory. Regardless of the physical implementation, the write-once register must be read and write accessible by all the application servers.

Figure 4:
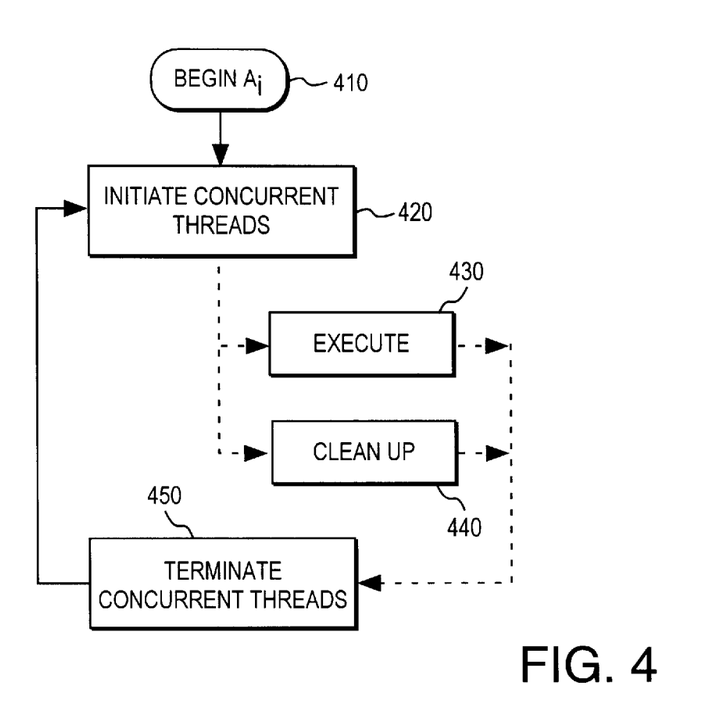
FIG. 4 illustrates a second tier portion of a three tier asynchronous transaction replication process.

FIG. 4 illustrates a portion of the asynchronous replication process at the application server level for a given application server, $a_i$, beginning with step 410. Step 420 indicates the beginning of a block of concurrently executed processes. In particular, the application server performs an execute process 430 and a clean up process 440 concurrently. Once either process is completed, step 450 marks the end of the concurrent thread block, however, the processes are designed such that the threads never complete during normal processing. Steps 420–450 are then repeated as long as the application server does not experience a crash.

Figure 5A:
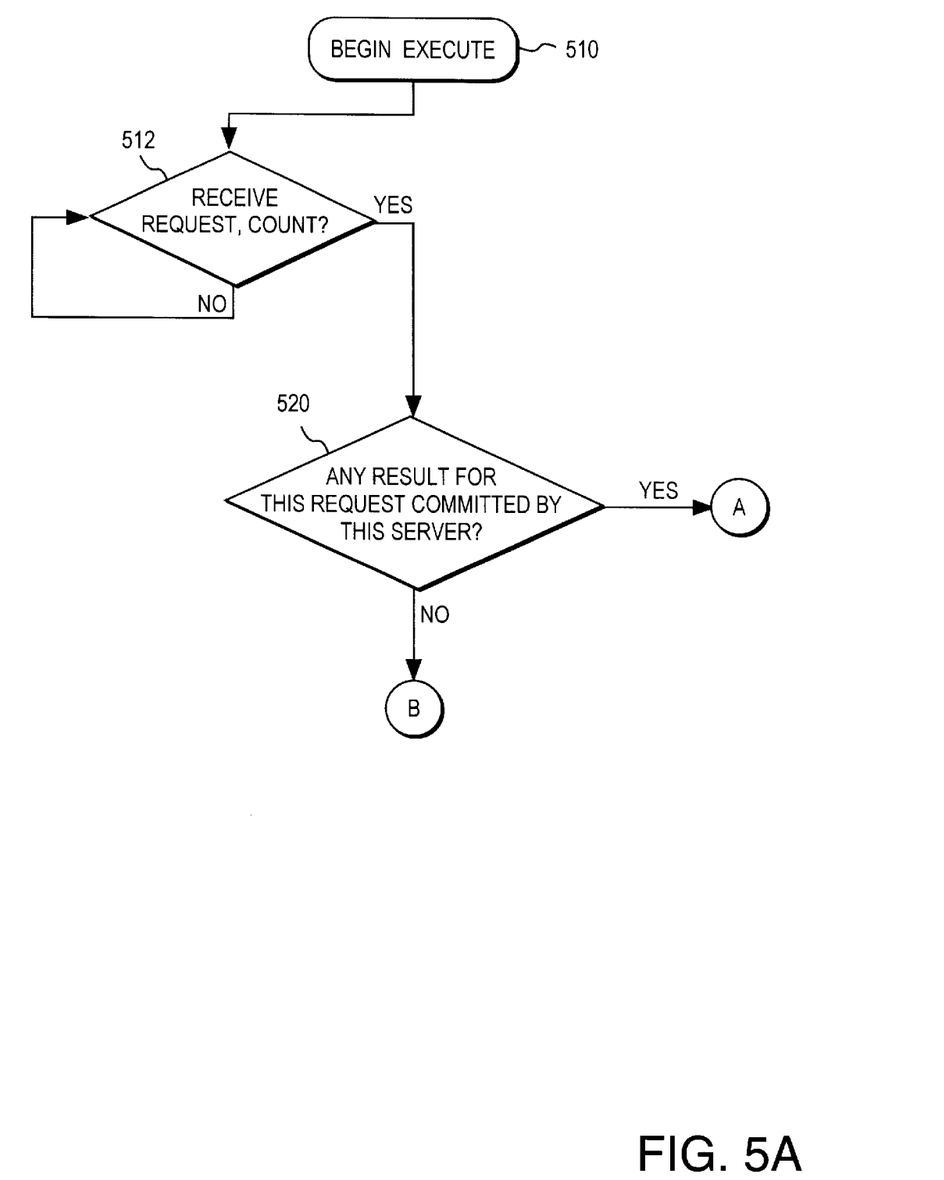
FIGS. 5A–5B illustrate a second tier execute process.
Figure 5B:
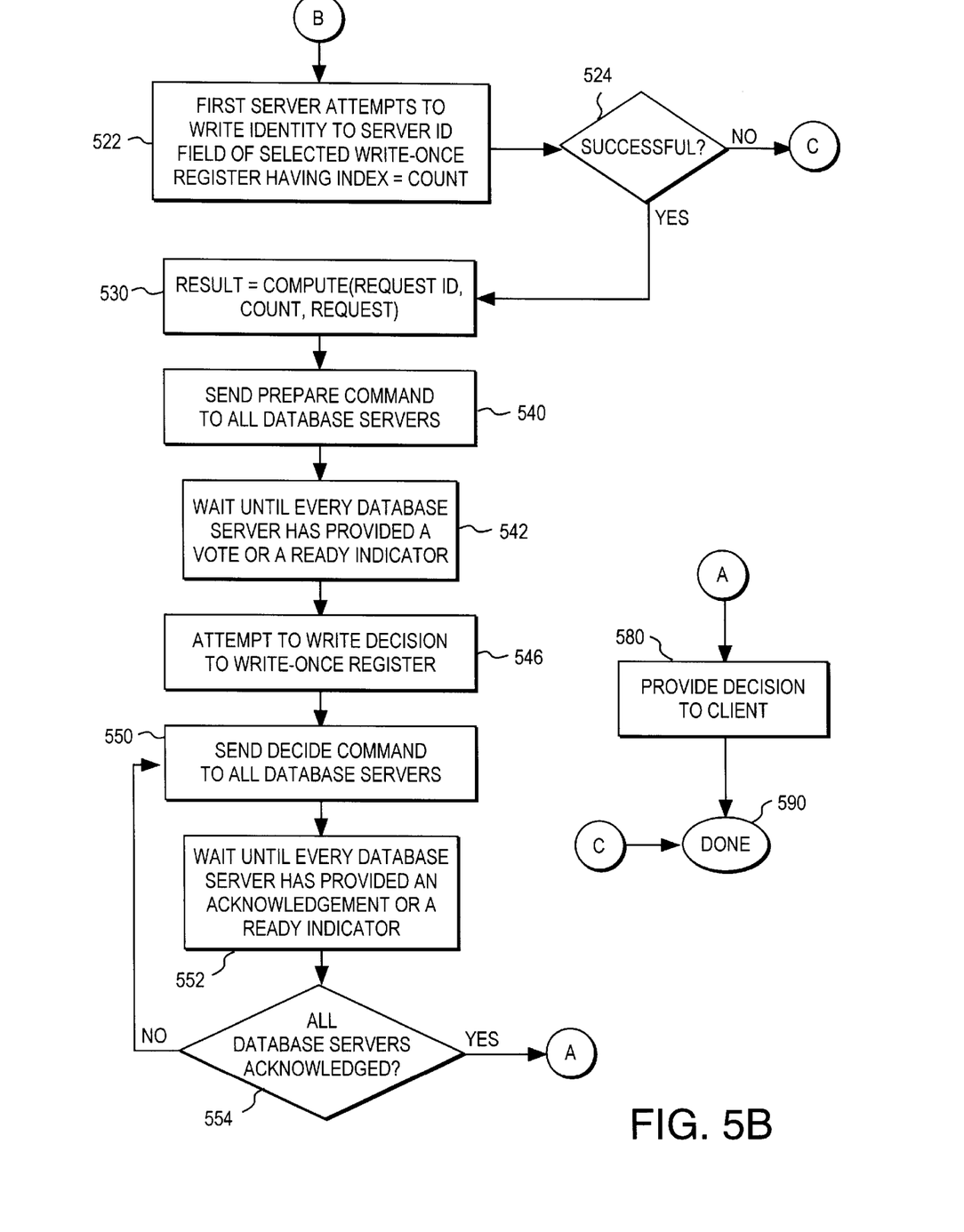

FIGS. 5A and 5B illustrate the execute process (step 430) for the application server beginning with step 510. The application server waits until a request and a count have been received from a client as indicated by step 512. Once a request and count have been received, step 520 determines whether a result has been committed for this request by this application server. If so, then processing continues with step 580 of FIG. 5B where the committed result is returned to the client in the form of the decision. Otherwise processing continues with step 522 of FIG. 5B.

In step 522, the first server attempts to write its own identity to the server ID field of the write-once register identified by the request ID at the index position identified by the count. If no write-once register is associated with the request ID, then step 522 allocates a write-once register for the request ID before attempting to write the server identity. If another server has already written a value, then this operation will not be successful. If the operation is not successful as determined by step 524, then the server ignores the request because another application server has taken ownership of the request. The application tier execute process is then completed in step 590.

If the operation is successful, then the first server is able to maintain ownership of the request. In step 530, the result for the request is computed. This step performs the business logic associated with the request.

After a result is obtained, step 540 sends the prepare command to all database servers. The prepare command is part of a two-phase database commit process. Step 542 waits until every database server has responded with a vote or a ready indicator. The databases are presumed to provide a ready signal to indicate return to service. A request may have been sent while the database server was offline or the database server may have failed during processing of the request. The ready signal allows the conclusion that a failed database server has voted "no". This approach ensures that all database failures will eventually be detected.

In step 546, the application server attempts to write a decision including the result and an outcome to the selected write-once register entry. The outcome is commit if all database servers returned an affirmative vote in step 542. If any database server returned a negative vote or an abort, then the outcome to be written is abort.

Step 550 sends a decide command to all database servers. The decide command identifies the decision outcome for a specified request. In step 552, the application server waits until every database server has provided an acknowledgement or a ready indicator. Step 554 checks whether the decision outcome was unanimously acknowledged. If not, or if at least one database server issued a ready indicator rather than an acknowledgement, the decide command is resent to the database servers in step 550. Steps 550–554 are repeated until all database servers have acknowledged the decision outcome.

The decision is then provided to the client in step 580 once either all database servers have acknowledged the result (step 554) or if the result was previously indicated as being committed (FIG. 5A, step 520). The application server tier execute process is completed in step 590.

Figure 6:
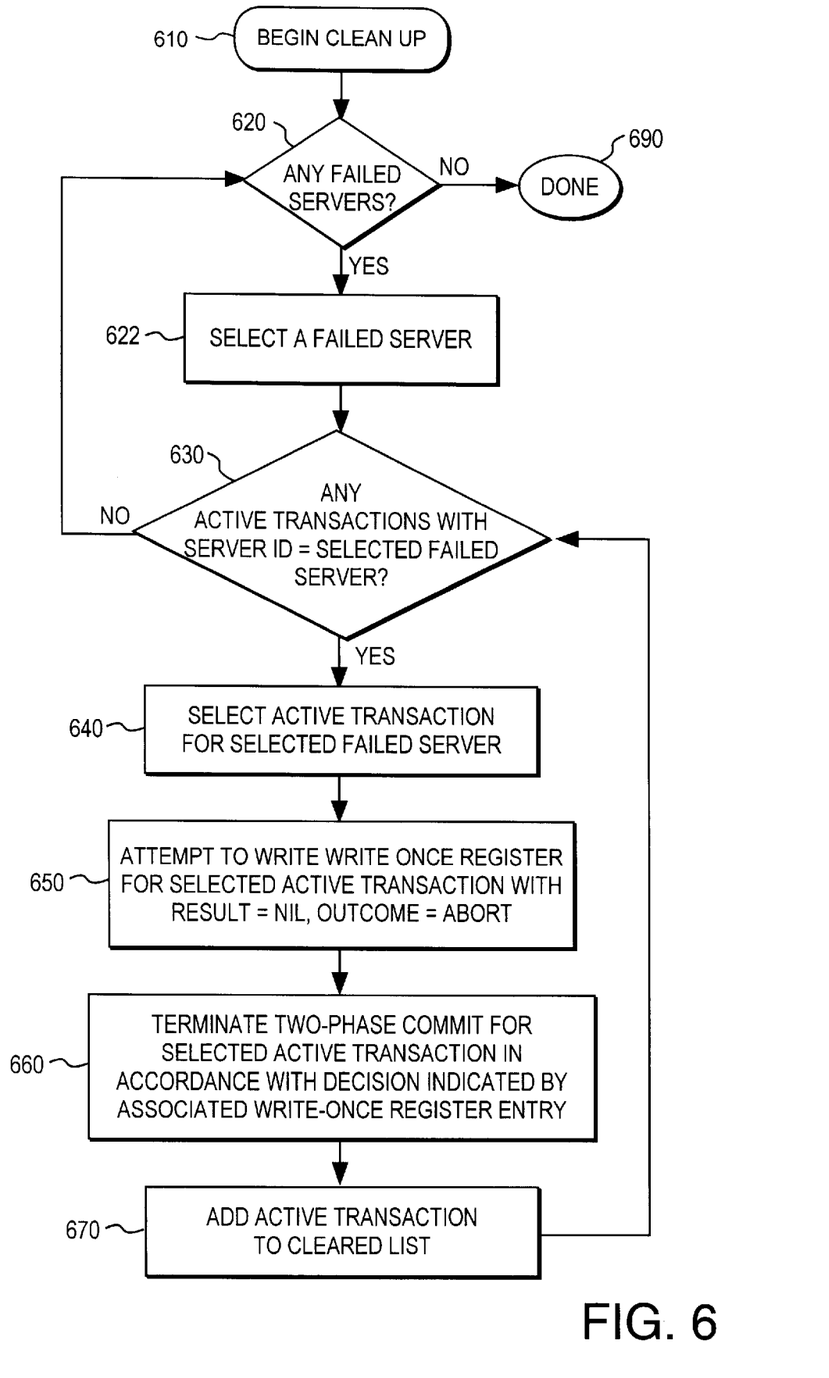
FIG. 6 illustrates a second tier clean up process.

The clean up process illustrated in FIG. 6 begins with step 610. The clean up process is used to terminate pending transactions through either a commit or an abort operation. Step 620 determines whether any other application servers have failed. If not, then the clean up process is finished in step 690.

If at least one server has failed, then a failed server is selected in step 622. The clean up process then determines whether there are any active transactions having the same server ID as the selected failed server in step 630. An active transaction is a transaction that is not a member of a cleared list of transactions. If there are no such transactions, then processing continues with step 620 to select another failed server, if any.

Otherwise, an active transaction for the selected failed server is selected in step 640. Server $a_i$ attempts to write the write-once register entry for the selected transaction with a nil result and an aborted outcome in step 650.

The two-phase commit process for the selected active transaction is terminated in accordance with the decision outcome indicated by the corresponding entry in the write-once register in step 660. When an attempt is made to write a proposed value to the outcome portion of the write-once register, the actual value stored in the outcome portion of the write-once register is returned. Thus if a proposed value is successfully written to the write-once register, then the proposed value is returned as the actual value. If, however, writing the proposed value is unsuccessful, the actual value already stored in the outcome portion of the write-once register is returned.

Termination of the two-phase commit process is accomplished by sending a decide command with the outcome returned from the write-once register entry in response to the attempt to write a proposed value. If a commit outcome was previously written to the register entry, then the present application server will send a decide command with a commit instruction for the transaction. Otherwise, a decide command with an abort instruction will be sent to the database servers. Once the transaction is appropriately terminated, the active transaction can be added to the list of cleared transactions in step 670. Steps 630–670 will be repeated for all active transactions of each suspected application server.

As indicated by step 650, the present application server attempts to write an abort instruction for the active transaction. Processing of the active transaction by the suspected server may have been interrupted at any point or may have been completed. The write-once register entry may have already had a commit instruction written. Alternatively, other application servers may also be attempting to abort the transaction and thus have written the abort instruction. In either case, the present application server may not be able to write the abort instruction to the appropriate write-once register entry. If any application server (even the failed server) had attempted to abort the transaction, then the present application server will issue the abort command. Similarly, if the failed server had processed the transaction substantially or even completely with a "commit" instruction, then a commit instruction will be sent to ensure the transaction is properly terminated.

This approach enables a fast convergence on the same decision (result and outcome) regardless of how many application servers are attempting to terminate the transaction. Moreover, inaccurate detection of failure is acceptable because consistency is maintained. The write-once register approach ensures that regardless of whether a transaction is terminated by a given server or by servers suspecting the given server, the decision is the same.

Figure 7:
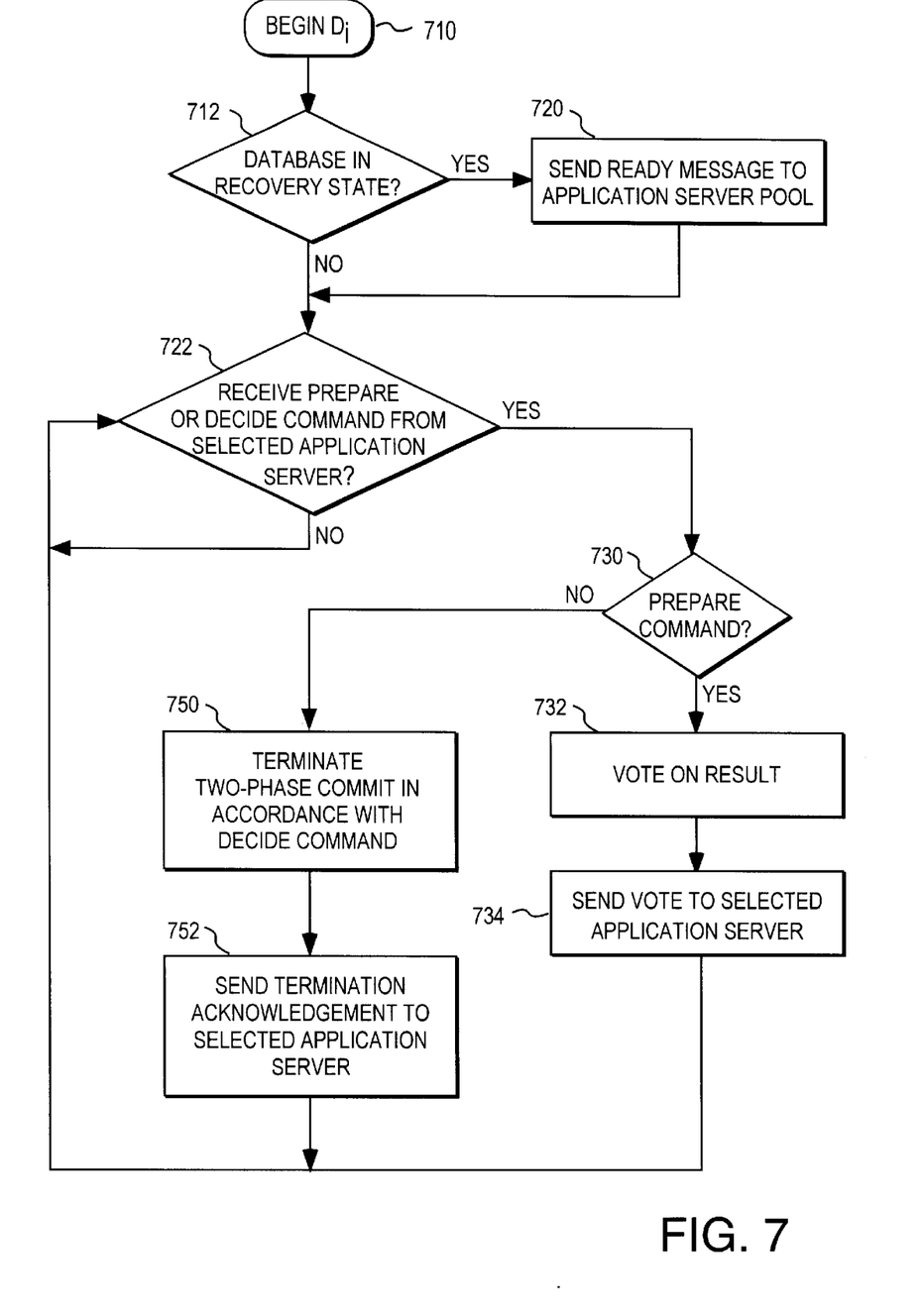
FIG. 7 illustrates a third tier portion of a three tier asynchronous transaction replication process.

FIG. 7 illustrates the processing that occurs at the database server level for each database server, $d_i$ beginning with step 710. Step 712 determines whether the database is in a recovery state. If so, then the database server sends a "ready" message to the application server pool in step 720 before continuing with step 722. The database server waits until a prepare or a decide command has been received from a selected application server as indicated by step 722.

Once a prepare or decide command has been received, step 730 determines whether the command is a prepare command. If so, then the database server votes on the tentative result in step 732. The vote (e.g., {yes, no}) is then returned to the selected application server in step 734 before returning to step 722 to wait for the next prepare or decide command.

If, the command is a decide command, then step 750 is performed after step 730. The two-phase commit process is terminated in step 750 in accordance with the decide command. If the decide command indicates "abort", then the transaction will be aborted. If the decide command includes a "commit" instruction, the transaction will be committed. After terminating the transaction, a termination acknowledgement is sent to the selected application server in step 752 before returning to step 722 to wait for the next prepare or decide command.

A retirement process can be used to determine when to permit re-allocation of memory used for the write-once registers. The length of time that a write-once register should survive after termination should be limited in order to free resources (e.g., memory) for subsequent unrelated requests. The length of time should be long enough, however, to enable determining whether an incoming request is a retry request or a new request explicitly issued by the end user. In other words, the issue is how long the interval should be before an ambiguous request is considered to be another request originating from the end-user rather than an automatically retried request.

In one embodiment, the write-once registers are reclaimed a predetermined time period after a result has been committed. In one embodiment, the write-once registers are alternately reclaimed a pre-determined time period after no activity (i.e., no reads or writes) to provide for the possibility of client tier crashes.

Alternatively, a client-driven retirement process can be used in conjunction with the time-based retirement process. In particular, the clients can send notification to the application servers to indicate when transactions associated with a particular request can be cleared (i.e., before the expiration time) and thus when the write-once register can be reclaimed. In one embodiment, the notification serves to indicate that the write-once register can be reclaimed upon receipt. In the event notification is not received in a timely fashion, the write-once register may be reclaimed after a predetermined expiration time period has elapsed.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A computer method for providing a three tier asynchronous client transparency comprising the steps of:
    a) sending a request and a count from a client to a first application server of an application server group; and
    b) resending the request and count to the application server group, if no corresponding decision is received within pre-determined time period.

2. The method of claim 1 further comprising the step of:
    c) incrementing the count and resending the request and incremented count to a selected one of the first application server and the application server group if the outcome of the decision indicates that the result has not been committed.

3. The method of claim 2 further comprising the step of:
    d) providing a result of the decision to an end-user, if the outcome indicates that the result has been committed.

4. The method of claim 1 further comprising the steps of:
    c) attempting to write a first application server identifier to a write-once register entry associated with the request, wherein each instance of the request corresponds to a unique write-once register entry.

5. A computer method for providing a three tier asynchronous client transparency comprising the steps of:

a) sending a request and a count from a client to a first application server of an application server group; and
    b) incrementing the count and resending the request and incremented count to a selected one of the first application server and the application server group, if a corresponding decision indicates that the result has not been committed.

6. The method of claim 5 further comprising the step of:
    c) resending the request and count to the application server group, if no corresponding decision is received within pre-determined time period.

7. The method of claim 5 further comprising the step of:
    c) providing a result of the decision to an end-user, if the outcome indicates that the result has been committed.

8. The method of claim 5 further comprising the steps of:
    c) attempting to write a first application server identifier to a write-once register entry associated with the request, wherein each instance of the request corresponds to a unique write-once register entry.

9. A computer method for providing a three tier asynchronous client transparency comprising the steps of:
    a) receiving a request originating from a client tier; and
    b) attempting to write a first application server identifier to a first portion of a write-once register entry associated with the request in response to receipt of the request by the first application server.

10. The method of claim 9 further comprising the steps of:
    c) computing a result for the request;
    d) determining an outcome for the result; and
    e) attempting to write the result and outcome as a first decision to a second portion of the write-once register entry.

11. The method of claim 10 further comprising the step of:
    d) attempting to terminate a transaction identified by the write-once register entry in accordance with a second decision indicated by the second portion of the write-once register entry.

12. The method of claim 11 wherein the first and second decisions are identical.

13. The method of claim 11 further comprising the steps of:
    e) repeating step d) until receiving acknowledgment of the termination of the transaction.

14. The method of claim 11 further comprising the steps of:
    f) providing the second decision to the client tier.

15. A computer method for providing a three tier asynchronous client transparency comprising the steps of:
    a) selecting an active transaction of a suspected application server of an application server tier;
    b) attempting to write a decision having an aborted first outcome to a write-once register entry associated with the selected active transaction; and
    c) issuing commands to a database tier to terminate the transaction in accordance with a second outcome indicated by the write-once register entry.

16. The method of claim 15 wherein the first and second outcomes are identical.

17. The method of claim 15 further comprising the step of:
    d) adding the selected active transaction to a cleared list:
    e) repeating steps a)–d) for each active transaction of the suspected application server.

18. The method of claim 17 further comprising the step of:
    f) repeating steps a)–e) for each suspected application server of the application server tier.

19. A computer readable storage medium storing processor executable instructions, wherein the instructions instruct the processor to perform a computer method for providing a three tier asynchronous client transparency comprising the steps of:

a) attempting to write a first server identifier to a first portion of a write-once register entry associated with a received request originating from a client tier;

b) computing a result for the request.

20. The computer readable storage medium of claim 19, wherein the instructions further instruct the processor to perform the steps of:

c) querying a database to determine an outcome for the result;

d) attempting to write the result and outcome as a first decision to a second portion of the write-once register entry; and e) commanding the database to terminate the transaction identified by the request in accordance with a second decision indicated by the second portion of the write-once register entry.

* * * * *